United States Patent
Berkley et al.

(10) Patent No.: US 12,475,394 B2
(45) Date of Patent: Nov. 18, 2025

(54) SYSTEMS AND METHODS FOR IMPROVING EFFICIENCY OF CALIBRATION OF QUANTUM DEVICES

(71) Applicant: D-WAVE SYSTEMS INC., Burnaby (CA)

(72) Inventors: Andrew J. Berkley, Vancouver (CA); Ilya V. Perminov, Vancouver (CA)

(73) Assignee: D-WAVE SYSTEMS INC., Burnaby (CA)

( * ) Notice: Subject to any disclaimer, the term of this patent is extended or adjusted under 35 U.S.C. 154(b) by 145 days.

(21) Appl. No.: 17/742,587

(22) Filed: May 12, 2022

(65) Prior Publication Data

US 2024/0028938 A1 Jan. 25, 2024

Related U.S. Application Data

(60) Provisional application No. 63/210,176, filed on Jun. 14, 2021.

(51) Int. Cl.
*G06N 10/20* (2022.01)
*G06N 10/40* (2022.01)

(52) U.S. Cl.
CPC .............. *G06N 10/20* (2022.01); *G06N 10/40* (2022.01)

(58) Field of Classification Search
None
See application file for complete search history.

(56) References Cited

U.S. PATENT DOCUMENTS 6,373,294 B1 4/2002 Bentley
6,911,664 B2 6/2005 Il et al.
(Continued)

FOREIGN PATENT DOCUMENTS

CN 107580752 A 1/2018
KR 101446943 B1 10/2014
(Continued)

OTHER PUBLICATIONS

Notice of Allowance for U.S. Appl. No. 17/272.052, mailed Aug. 3, 2023, 10 pages.
(Continued)

*Primary Examiner* — Schyler S Sanks
(74) *Attorney, Agent, or Firm* — Cozen O'Connor (57) ABSTRACT

Methods and systems for calibrating quantum processors are discussed. A model of a portion of the processor to be calibrated has one or more determinable parameters and an uncertainty for the determinable parameter(s). A measurement procedure is iteratively performed by selecting a subset of possible measurements and generating predicted measurement outcomes and predicted uncertainties for the determinable parameter for each measurement in the subset of possible measurements. Based on the predicted reduction in uncertainty for the determinable parameter, one or more measurements is selected. Instructions are transmitted to the quantum processor to perform the selected measurements, and the results are returned to update the model of the portion of the processor to be calibrated. Once a termination criteria is met, a calibrated value is generated for the determinable parameter. Compensating signals can be applied to devices of the quantum processor to calibrate the devices.

22 Claims, 4 Drawing Sheets

(56) References Cited

U.S. PATENT DOCUMENTS

| | | |
|---|---|---|
| 7,135,701 B2 | 11/2006 | Amin et al. |
| 7,230,266 B2 | 6/2007 | Hilton et al. |
| 7,307,275 B2 | 12/2007 | Lidar et al. |
| 7,418,283 B2 | 8/2008 | Amin |
| 7,533,068 B2 | 5/2009 | Maassen et al. |
| 7,619,437 B2 | 11/2009 | Thom et al. |
| 7,639,035 B2 | 12/2009 | Berkley |
| 7,843,209 B2 | 11/2010 | Berkley |
| 7,876,248 B2 | 1/2011 | Berkley et al. |
| 7,898,282 B2 | 3/2011 | Harris et al. |
| 7,921,072 B2 | 4/2011 | Bohannon et al. |
| 7,932,907 B2 | 4/2011 | Nachmanson et al. |
| 7,984,012 B2 | 7/2011 | Coury et al. |
| 8,008,942 B2 | 8/2011 | Van et al. |
| 8,018,244 B2 | 9/2011 | Berkley |
| 8,035,540 B2 | 10/2011 | Berkley et al. |
| 8,098,179 B2 | 1/2012 | Bunyk et al. |
| 8,169,231 B2 | 5/2012 | Berkley |
| 8,174,305 B2 | 5/2012 | Harris |
| 8,175,995 B2 | 5/2012 | Amin |
| 8,190,548 B2 | 5/2012 | Choi |
| 8,195,596 B2 | 6/2012 | Rose et al. |
| 8,283,943 B2 | 10/2012 | Van Den Brink et al. |
| 8,421,053 B2 | 4/2013 | Bunyk et al. |
| 8,429,108 B2 | 4/2013 | Eusterbrock |
| 8,560,282 B2 | 10/2013 | Love et al. |
| 8,854,074 B2 | 10/2014 | Berkley |
| 8,874,477 B2 | 10/2014 | Hoffberg |
| 8,972,237 B2 | 3/2015 | Wecker |
| 9,189,217 B2 | 11/2015 | Von Platen et al. |
| 9,588,940 B2 | 3/2017 | Hamze et al. |
| 9,710,758 B2 | 7/2017 | Bunyk et al. |
| 10,031,887 B2 | 7/2018 | Raymond |
| 10,650,050 B2 | 5/2020 | He et al. |
| 10,872,021 B1 | 12/2020 | Tezak et al. |
| 11,062,227 B2 | 7/2021 | Amin et al. |
| 11,087,616 B2 | 8/2021 | Rom et al. |
| 11,422,958 B2 | 8/2022 | Boothby et al. |
| 11,875,222 B1 | 1/2024 | Reagor |
| 2002/0180006 A1 | 12/2002 | Franz et al. |
| 2002/0188578 A1 | 12/2002 | Amin et al. |
| 2003/0102470 A1 | 6/2003 | Il et al. |
| 2003/0169041 A1 | 9/2003 | Coury et al. |
| 2005/0008050 A1 | 1/2005 | Fischer et al. |
| 2007/0180586 A1 | 8/2007 | Amin |
| 2007/0239366 A1 | 10/2007 | Hilton et al. |
| 2008/0052055 A1 | 2/2008 | Rose et al. |
| 2009/0078931 A1 | 3/2009 | Berkley |
| 2009/0192041 A1 | 7/2009 | Johansson et al. |
| 2009/0259905 A1* | 10/2009 | Silva .............. B82Y 10/00 977/933 |
| 2009/0261319 A1 | 10/2009 | Maekawa et al. |
| 2009/0289638 A1 | 11/2009 | Farinelli et al. |
| 2010/0150222 A1 | 6/2010 | Meyers et al. |
| 2011/0054876 A1 | 3/2011 | Biamonte et al. |
| 2011/0057169 A1 | 3/2011 | Harris et al. |
| 2011/0060780 A1 | 3/2011 | Berkley et al. |
| 2011/0065586 A1 | 3/2011 | Maibaum et al. |
| 2011/0138344 A1 | 6/2011 | Ahn |
| 2012/0023053 A1 | 1/2012 | Harris et al. |
| 2012/0087867 A1 | 4/2012 | Mccamey et al. |
| 2012/0144159 A1 | 6/2012 | Pesetski et al. |
| 2012/0265718 A1 | 10/2012 | Amin et al. |
| 2013/0106476 A1 | 5/2013 | Joubert et al. |
| 2013/0117200 A1 | 5/2013 | Thom |
| 2013/0267032 A1 | 10/2013 | Tsai et al. |
| 2014/0229722 A1 | 8/2014 | Harris |
| 2015/0262073 A1 | 9/2015 | Lanting |
| 2015/0286748 A1 | 10/2015 | Lilley |
| 2015/0363708 A1 | 12/2015 | Amin et al. |
| 2016/0079968 A1 | 3/2016 | Strand et al. |
| 2016/0233860 A1 | 8/2016 | Naaman |
| 2016/0238360 A1 | 8/2016 | Naud et al. |
| 2016/0267032 A1 | 9/2016 | Rigetti et al. |
| 2016/0364653 A1 | 12/2016 | Chow et al. |
| 2017/0017894 A1* | 1/2017 | Lanting ................. G06N 10/70 |
| 2017/0104695 A1 | 4/2017 | Naaman |
| 2017/0300454 A1 | 10/2017 | Maassen Van Den Brink et al. |
| 2017/0351967 A1 | 12/2017 | Babbush et al. |
| 2017/0364362 A1 | 12/2017 | Lidar et al. |
| 2018/0101786 A1 | 4/2018 | Boothby |
| 2018/0123544 A1 | 5/2018 | Abdo |
| 2019/0019098 A1 | 1/2019 | Przybysz |
| 2019/0042677 A1* | 2/2019 | Matsuura ............... G06N 10/20 |
| 2019/0042967 A1 | 2/2019 | Yoscovits et al. |
| 2019/0043919 A1 | 2/2019 | George et al. |
| 2019/0266508 A1 | 8/2019 | Bunyk et al. |
| 2019/0378874 A1 | 12/2019 | Rosenblatt et al. |
| 2019/0391093 A1 | 12/2019 | Achlioptas et al. |
| 2019/0392352 A1 | 12/2019 | Lampert et al. |
| 2020/0005155 A1 | 1/2020 | Datta et al. |
| 2020/0183768 A1 | 6/2020 | Berkley et al. |
| 2020/0334563 A1 | 10/2020 | Gambetta et al. |
| 2020/0342345 A1 | 10/2020 | Farhi et al. |
| 2020/0342347 A1* | 10/2020 | Gambetta ............. G06N 10/70 |
| 2020/0349326 A1 | 11/2020 | King |
| 2020/0379768 A1 | 12/2020 | Berkley et al. |
| 2020/0380396 A1 | 12/2020 | Raymond |
| 2022/0207404 A1 | 6/2022 | Boothby |
| 2024/0028938 A1 | 1/2024 | Berkley et al. |

FOREIGN PATENT DOCUMENTS

| | | | |
|---|---|---|---|
| WO | 2005093649 A1 | 10/2005 | |
| WO | 2007085074 A1 | 8/2007 | |
| WO | 2012064974 A2 | 5/2012 | |
| WO | 2014123980 A1 | 8/2014 | |
| WO | 2016182608 A2 | 11/2016 | |
| WO | 2016183213 A1 | 11/2016 | |
| WO | 2017214331 A1 | 12/2017 | |
| WO | 2018064535 A1 | 4/2018 | |
| WO | 2018111242 A1 | 6/2018 | |
| WO | 2019005206 A1 | 1/2019 | |
| WO | 2019070935 A2 | 4/2019 | |
| WO | 2019168721 A1 | 9/2019 | |
| WO | 2020112185 A2 | 6/2020 | |
| WO | WO-2020108957 A1 * | 6/2020 | ............. G06N 10/80 |
| WO | 2021011412 A1 | 1/2021 | |

OTHER PUBLICATIONS

Harris et al., "Experimental Demonstration of a Robust and Scalable Flux Qubit," arXiv:0909.4321v1, Sep. 24, 2009, 20 pages.

Whiticar, et al., Probing flux and charge noise with macroscopic resonant tunneling, arXiv:2210.01714v1 [quant-ph] Oct. 4, 2022. 11 pages.

Amin, M., "Searching for Quantum Speedup in Quasistatic Quantum Annealers," arXiv:1503.04216v2 [quant-ph] Nov. 19, 2015, 5 pages.

Amin et al., "First Order Quantum Phase Transition in Adiabatic Quantum Computation", arXiv:0904.1387v3, Dec. 15, 2009, 5 pages.

Amin et al., Macroscopic Resonant Tunneling in the Presence of Low Frequency Noise, arXiv:0712.0845 [cond-mat.mes-hall], May 13, 2008, pp. 1-4.

Amin, "Effect of Local Minima on Adiabatic Quantum Optimization," Physical Review Letters 100(130503), 2008, 4 pages.

Aspuru-Guzik. "Simulated Quantum Computation of Molecular Energies", Science, Sep. 9, 2005.

Berkley, A.J. et al., "Tunneling Spectroscopy Using a Probe Qubit," arXiv:1210.6310v2 [cond-mat.supr-con], Jan. 3, 2013, 5 pages.

Bunyk et al., "Architectural Considerations in the Design of a Superconducting Quantum Annealing Processor," IEEE Trans. Appl. Supercond., 24, arXiv:1401.5504v1 [quant-ph] Jan. 21, 2014, 9 pages.

Byrd. "A Limited-Memory Algorithm for Bound-Contrained Optimization". SIAM Journal on Scientific Computing, Jun. 17, 2005.

Dhande et al. "End-User Calibration for Quantum Annealing". Engineering Project Report—UBC, Jan. 6, 2019.

D-Wave, "Technical Description of the D-Wave Quantum Processing Unit", D-Wave User Manual 09-1109A-M, Sep. 24, 2018, 56 pages.

(56) References Cited

OTHER PUBLICATIONS

Gao, Jiansong, "The Physics of Superconducting Microwave Resonators," Thesis, In Partial Fulfillment of the Requirements for the Degree of Doctor of Philosophy, California Institute of Technology Pasadena, California, May 28, 2008, 197 pages.
Harris et al., "Probing Noise in Flux Qubits via Macroscopic Resonant Tunneling", arXiv:0712.0838v2 [cond-mat.mes-hall], Feb. 8, 2008, pp. 1-4.
International Search Report for PCT/US2019/047747, mailed Jun. 26, 2020, 4 pages.
King et al., "Observation of topological phenomena in a programmable lattice of 1,800 qubits", arXiv:1803.02047 [quant-ph], Mar. 6, 2018, 17 pages.
Lanting et al., "Geometrical dependence of the low-frequency noise in superconducting flux qubits", Physical Review B, 79, 060509, Jun. 5, 2009, 4 pages.
Lanting et al., "Probing High Frequency Noise with Macroscopic Resonant Tunneling", arXiv:1103.1931v1 [cond-mat.supr-con], Mar. 20, 2011, 5 pages.
Lanting, T., "Observation of Co-tunneling in Pairs of Coupled Flux Qubits", arXiv:1006.0028v1 [cond-mat.supr-con], May 31, 2010, 4 pages.
Manucharyan et al., "Fluxonium: single Cooper pair circuit free of charge offsets", arXiv:0906.0831v2, [cond-mat.mes-hall] Oct. 20, 2009, 13 pages.
Nielsen. "The Fermionic canonical commutation relations and the Jordan-Wigner transform", School of Physical Sciences, Jul. 29, 2005.
Petersan et al., "Measurement of resonant frequency and quality factor of microwave resonators: Comparison of methods," Journal of Applied Physics, vol. 84, No. 6, Sep. 15, 1998, 11 pages.
Sete et al., "A Functional Architecture for Scalable Quantum Computing", 2016 IEEE International Conference on Rebooting Computing (ICRC), Oct. 17, 2016, 5 pages.
Swenson et al., "Operation of a titanium nitride superconducting microresonator detector in the nonlinear regime," arXiv:1305.4281v1 [cond-mat.supr-con], May 18, 2013, 11 pages.
Tolpygo et al., "Advanced Fabrication Process for Superconducting Very Large Scale Integrated Circuits", https://arxiv.org/abs/1509.05081, accessed Sep. 16, 2015.
Van Harlingen et al., "Decoherence in Josephson-junction qubits due to critical current fluctuations", arXiv:cond-mat/0404307v1 [cond-mat.supr-con], Apr. 13, 2004, 24 pages.
Whittaker, J.D. et al., "A Frequency and Sensitivity Tunable Microresonator Array for High-Speed Quantum Processor Readout," arXiv:1509.05811v2 [quant-ph], Apr. 22, 2016, 8 pages.
Written Opinion for PCT/US2019/047747, mailed Jun. 26, 2020, 4 pages.
Yohannes et al, "Planarized, Extensible, Multilayer, Fabrication Process for Superconducting Electronics", IEEE Transactions on Applied Superconductivity, vol. 25, No. 3, Jun. 2015.
Boothby, K., "Input/Output Systems and Methods for Superconducting Devices," U.S. Appl. No. 62/860,098, filed Jun. 11, 2019, 31 pages.
Boothby, K., et al., "Systems and Methods for Efficient Input and Output to Quantum Processors," U.S. Appl. No. 62/851,377, filed May 22, 2019, 40 pages.
Chen, Y. et al., "Multiplexed Dispersive Readout of Superconducting Phase Qubits," Applied Physics Letters 101 (182601), 2012, 4 pages.
Heinsoo, J. et al., "Rapid high-fidelity multiplexed readout of superconducting qubits," arXiv:1801.07904v1 [quant-ph], Jan. 24, 2018, 13 pages.
International Search Report & Written Opinion for PCT/US2020/041703 mailed Oct. 27, 2020, 9 pages.
International Search Report for PCT/US2020/037222, mailed Sep. 17, 2020, 3 pages.
Michotte, S., "Qubit Dispersive Readout Scheme with a Microstrip Squid Amplifier," arXiv:0812.0220v1 [cond-mat.supr-con], Dec. 1, 2008, 4 pages.
Vollmer, R., "Fast and scalable readout for fault-tolerant quantum computing with superconducting Qubits," Master's Thesis, QuTech, Department of Quantum Nanoscience, Delft University of Technology, Jul. 10, 2018, 80 pages.
Written Opinion for PCT/US2020/037222, mailed Sep. 17, 2020, 5 pages.
Extended EP Search Report mailed Jun. 26, 2023, EP App No. 20841331.0-11203—14 pages.
King, Kibble-Zurek-like Scaling in the Fast Anneal Regime, 2021.

* cited by examiner

SYSTEMS AND METHODS FOR IMPROVING EFFICIENCY OF CALIBRATION OF QUANTUM DEVICES

FIELD

This disclosure generally relates to systems and methods for improving efficiency of calibration of devices of a quantum processor, and in particular relates to a hybrid approach for efficiently selecting measurements to be performed to calibrate quantum devices.

BACKGROUND

Quantum Devices

Quantum devices are structures in which quantum mechanical effects are observable. Quantum devices include circuits in which current transport is dominated by quantum mechanical effects. Such devices include spintronics and superconducting circuits. Both spin and superconductivity are quantum mechanical phenomena. Quantum devices can be used for measurement instruments, in computing machinery, and the like.

Quantum Computation

A quantum computer is a system that makes direct use of at least one quantum-mechanical phenomenon, such as superposition, tunneling, and entanglement, to perform operations on data. The elements of a quantum computer are qubits. Quantum computers can provide speedup for certain classes of computational problems such as computational problems simulating quantum physics.

Quantum Processor

A quantum processor may take the form of a superconducting quantum processor. A superconducting quantum processor may include a number of superconducting qubits and associated local bias devices. A superconducting quantum processor may also include coupling devices (also known as couplers or qubit couplers) that selectively provide communicative coupling between qubits.

Superconducting qubits are solid state qubits based on circuits of superconducting materials. Operation of superconducting qubits is based on the underlying principles of magnetic flux quantization, and Josephson tunneling. Superconducting effects can be present in different configurations and can give rise to different types of superconducting qubits including flux, phase, charge, and hybrid qubits. The different configurations can vary in the topology of the loops, the placement of the Josephson junctions, and the physical parameters of elements of the superconducting circuits, such as inductance, capacitance, and Josephson junction critical current.

In one implementation, the superconducting qubit includes a superconducting loop interrupted by a Josephson junction. The inductance and the critical current may be selected, adjusted, or tuned, to increase the ratio of the inductance of the Josephson junction to the geometric inductance of the superconducting loop, and to cause the qubit to be operable as a bistable device. In some implementations, the ratio of the inductance of the Josephson junction to the geometric inductance of the superconducting loop of a qubit is approximately equal to three.

In one implementation, the superconducting coupler includes a superconducting loop interrupted by a Josephson junction. The inductance and the critical current may be selected, adjusted, or tuned, to decrease the ratio of the inductance of the Josephson junction to the geometric inductance of the superconducting loop, and to cause the coupler to be operable as a monostable device. In some implementations, the ratio of the inductance of the Josephson junction to the geometric inductance of the superconducting loop of a coupler is approximately equal to, or less than, one.

Further details and embodiments of exemplary quantum processors that may be used in conjunction with the present systems and devices are described in, for example, U.S. Pat. Nos. 7,533,068; 8,008,942; 8,195,596; 8,190,548; and 8,421,053.

Hybrid Computing System Comprising a Quantum Processor

A hybrid computing system can include a digital computer communicatively coupled to an analog computer. In some implementations, the analog computer is a quantum computer and the digital computer is a classical computer.

The digital computer can include a digital processor that can be used to perform classical digital processing tasks described in the present systems and methods. The digital computer can include at least one system memory which can be used to store various sets of computer- or processor-readable instructions, application programs and/or data.

The quantum computer can include a quantum processor that includes programmable elements such as qubits, couplers, and other devices. The qubits can be read out via a readout system, and the results communicated to the digital computer. The qubits and the couplers can be controlled by a qubit control system and a coupler control system, respectively. In some implementations, the qubit and the coupler control systems can be used to implement quantum annealing on the analog computer.

Quantum Processor Architecture

A quantum processor is any computer processor that is designed to leverage at least one quantum mechanical phenomenon (such as superposition, entanglement, tunneling, etc.) in the processing of quantum information. Regardless of the specific hardware implementation, all quantum processors encode and manipulate quantum information in quantum mechanical objects or devices called quantum bits, or "qubits;" all quantum processors employ structures or devices for communicating information between qubits; and all quantum processors employ structures or devices for reading out a state of at least one qubit. A quantum processor may include a large number (e.g., hundreds, thousands, millions, etc.) of programmable elements, including but not limited to: qubits, couplers, readout devices, latching devices (e.g., quantum flux parametron latching circuits), shift registers, digital-to-analog converters, and/or demultiplexer trees, as well as programmable sub-components of these elements such as programmable sub-components for correcting device variations (e.g., inductance tuners, capacitance tuners, etc.), programmable sub-components for compensating unwanted signal drift, and so on.

Among the large number of programmable elements of a quantum processor, there are inevitably: a) discrepancies between theoretical design specifications and the actual physical parameters of real, manufactured devices; and/or b) incongruences between nominally identical devices. For this reason, a quantum processor typically requires at least some calibration before operation. Calibrating the elements of a quantum processor may involve, for example, applying signals to the quantum processor elements; measuring responses, behaviors, and/or parameters that depend on the applied signals; and using the measurement results to influence how signals are applied to the quantum processor during subsequent operation. For example, a quantum processor element may be theoretically designed to produce a specific response when programmed with a signal of magnitude X, but due to a discrepancy between the theoretical design specifications and the actual physical parameters of the real, manufactured device, the quantum processor element may be found to produce the specific response when programmed with a signal of magnitude (X+dx). Similarly, two programmable elements in a quantum processor may be theoretically designed to behave in the same way in response to a globally applied signal, but due to an incongruence in the fabrication of the two elements their behaviors may diverge. Calibrating the elements of a quantum processor may detect such incongruences and inform their correction by, for example, the application of element-specific static bias signals. The calibration of the elements of a quantum processor is a challenging and time-consuming task that can involve the collection and analysis of very large amounts of data. In principle, each individual programmable element and potentially the pair-wise interactions between programmable elements may need to be characterized.

Machine Learning

Machine learning relates to methods and circuitry that can learn from data and make predictions based on data. In contrast to methods or circuitry that follow static program instructions, machine learning methods and circuitry can include deriving a model from example inputs (such as a training set) and using that model to make data-driven predictions. Machine learning tasks can include unsupervised learning, supervised learning, and reinforcement learning. Approaches to machine learning include, but are not limited to, decision trees, linear and quadratic classifiers, case-based reasoning, Bayesian statistics, and artificial neural networks.

Some problems can be expressed in terms of minimizing a loss function on a training set, where the loss function describes the disparity between the predictions of the model being trained and observable data. Example application areas include optical character recognition, search engine optimization, and computer vision.

The foregoing examples of the related art and limitations related thereto are intended to be illustrative and not exclusive. Other limitations of the related art will become apparent to those of skill in the art upon a reading of the specification and a study of the drawings.

BRIEF SUMMARY

Improving the efficiency and reducing the cost of calibrating the devices in a quantum processor is generally desirable and is particularly desirable as the number of devices in a quantum processor increases.

In order to reduce or minimize the cost of obtaining data to fit a model of a device within a quantum processor, measurements may be selected according to a process that provides an improved or optimal measurement schedule. Measurements made on the quantum processor may be selected to efficiently or optimally and reduce the number of measurements required to calibrate a given device to within a threshold.

According to an aspect, there is provided a method of calibrating a quantum processor by a digital processor with improved efficiency, the quantum processor comprising one or more quantum devices, the method being performed by the digital processor in communication with the quantum processor, the method comprising: receiving a model of a portion of the quantum processor to be calibrated, the portion of the quantum processor to be calibrated including the one or more quantum devices, the portion of the quantum processor to be calibrated having one or more determinable parameters, the model of a portion of the quantum processor to be calibrated having as model parameters the one or more determinable parameters and a current uncertainty for each of the one or more determinable parameters, receiving one or more initial values for the model parameters of the model of a portion of the quantum processor to be calibrated, initializing the model of the portion of the quantum processor to be calibrated based on the one or more initial values, iterating a measurement procedure until a termination criteria is reached, the measurement procedure comprising: choosing a subset of possible measurements from a set of possible measurements for the quantum processor, generating a predicted measurement outcome and a predicted uncertainty for the one or more determinable parameters for each measurement in the subset of possible measurements, selecting one or more measurements from the subset of possible measurements based on a predicted reduction in uncertainty for the one or more determinable parameters, transmitting instructions to the quantum processor to perform the one or more measurements, receiving a result of the one or more measurements from the quantum processor, and updating the model of the portion of the quantum processor to be calibrated based on the result of the one or more measurements, and generating one or more calibrated values for the one or more determinable parameters based on the updated model of the portion of the quantum processor to be calibrated.

According to other aspects, receiving a model of a portion of the quantum processor to be calibrated may comprise receiving a model comprising one or more physical parameters of the one or more quantum devices and one or more measurement parameters of the one or more quantum devices, and the model predicts an outcome of a measurement on the quantum processor, receiving one or more initial values for the model parameters of the model of a portion of the quantum processor to be calibrated may comprise receiving preliminary data for the portion of the quantum processor to be calibrated, and initializing the model of the portion of the quantum processor to be calibrated based on the one or more initial values may comprise initializing the model of the portion of the quantum processor to be calibrated based on the preliminary data, receiving preliminary data for the portion of the quantum processor to be calibrated may comprise receiving noisy measurement results, receiving a model of a portion of the quantum processor to be calibrated may comprise receiving a quantum-mechanical model of the one or more quantum devices, choosing a subset of possible measurements may comprise one of: selecting a complete set of possible measurements, discretizing the set of possible measurements and selecting a discrete subset, selecting a random subset of the set of possible measurements, and selecting a subset based on known properties of the one or more quantum devices, receiving a model of a portion of the quantum processor to be calibrated, the portion of the quantum processor to be calibrated including the one or more quantum devices may comprise receiving a model of a portion of the quantum processor to be calibrated, the portion of the quantum processor to be calibrated including one or more of a qubit, a coupler, a digital to analog converter (DAC), a control structure, and a readout device, selecting one or more measurements from the subset of possible measurements based on a predicted reduction in uncertainty for the one or more determinable parameters may comprise generating a measurement schedule based on a plurality of trained parameters of a machine learning model, the method may further comprise applying a signal to a control device in communication with the one or more quantum devices to adjust operation of the one or more quantum devices in response to generating the calibrated value for the one or more determinable parameters, receiving a model of a portion of the quantum processor to be calibrated may comprise receiving a model of a portion of the quantum processor to be calibrated that predicts an outcome of a measurement on the quantum processor, selecting one or more measurements from the subset of possible measurements based on a predicted reduction in uncertainty for the one or more determinable parameters may comprise selecting one or more measurements from the subset of possible measurements based on a projected reduction in a distance between a prediction of the model of an outcome of a measurement on the quantum processor and the actual outcome of the measurements, iterating a measurement procedure until a termination criteria is reached may comprise iterating a measurement procedure for one of: a number of iterations, a processing time, a number of measurements, a threshold accuracy for the one or more determinable parameters, a number of digital processor cycles, and a number of quantum processor cycles, the method may further comprise comparing the current uncertainty for the one or more determinable parameters to a threshold accuracy for the one or more determinable parameters, and iterating a measurement procedure until a termination criteria is reached may comprise iterating a measurement procedure until the current uncertainty for the one or more determinable parameters is less than or equal to the termination criteria, selecting one or more measurements from the subset of possible measurements may comprise selecting a set of multiple measurements from the subset of possible measurements, the set of multiple measurements comprising measurements that are measurable in parallel, and transmitting instructions to the quantum processor to perform the one or more measurements may comprise transmitting instructions to the quantum processor to perform the set of multiple measurements in parallel, and the method may further comprise generating the initial values by instructing the quantum processor to perform one or more initial measurements, and receiving one or more initial values may comprise receiving the one or more initial values from the quantum processor.

According to an aspect, there is provided a hybrid computing system, the hybrid computing system comprising: a quantum processor comprising one or more quantum devices, a digital processor communicatively coupled with the quantum processor, at least one non-transitory processor-readable medium that stores at least one of processor-executable instructions and data, and the digital processor communicatively coupled to the least one non-transitory processor-readable medium, which, in response to execution of the at least one of processor-executable instructions and data: receives a model of a portion of the quantum processor to be calibrated, the portion of the quantum processor to be calibrated including the one or more quantum devices, the portion of the quantum processor to be calibrated having one or more determinable parameters, the model of a portion of the quantum processor to be calibrated having as model parameters the one or more determinable parameters and a current uncertainty for each of the one or more determinable parameters, receives one or more initial values for the model parameters of the model of a portion of the quantum processor to be calibrated, initializes the model of the portion of the quantum processor to be calibrated based on the one or more initial values, iterates a measurement procedure until a termination criteria is reached, in each iteration of the measurement procedure the digital processor: chooses a subset of possible measurements from a set of possible measurements for the quantum processor, generates a predicted measurement outcome and a predicted uncertainty for the one or more determinable parameters for each measurement in the subset of possible measurements, selects one or more measurements from the subset of possible measurements based on a predicted reduction in uncertainty for the one or more determinable parameters, transmits instructions to the quantum processor to perform the one or more measurements, receives a result of the one or more measurements from the quantum processor, and updates the model of the portion of the quantum processor to be calibrated, and generates one or more calibrated values for the one or more determinable parameters, following the iterations of the measurement procedure.

According to other aspects, the digital processor may receive a model comprising one or more physical parameters of the one or more quantum devices and one or more measurement parameters of the one or more quantum devices, and the model may predict an outcome of a measurement on the quantum processor, the portion of the quantum processor to be calibrated may include one or more of a qubit, a coupler, a digital to analog converter (DAC), a control structure, and a readout device, in response to execution of the at least one of processor executable instructions and data the digital processor may further apply a signal to a control device in communication with the one or more quantum devices to adjust operation of the one or more quantum devices in response to generating a calibrated value for the one or more determinable parameters, the model of a portion of the quantum processor to be calibrated may predict an outcome of a measurement on the quantum processor, to select one or more measurements from the subset of possible measurements based on a predicted reduction in uncertainty for the one or more determinable parameters the digital processor may select one or more measurements from the subset of possible measurements based on a projected reduction in a distance between a prediction of the model of an outcome of a measurement on the quantum processor and the actual outcome of the measurements, and the termination criteria may comprise one of a number of iterations, a processing time, a number of measurements, a threshold accuracy for the one or more determinable parameters, a number of digital processor cycles, and a number of quantum processor cycles.

According to an aspect, there is provided a hybrid computing system, the hybrid computing system comprising a quantum processor, a classical processor communicatively coupled with the quantum processor, at least one non-transitory processor-readable medium that stores at least one of processor-executable instructions and data, and the classical processor communicatively coupled to the least one non-transitory processor-readable medium, which, in response to execution of the at least one of processor-executable instructions and data, performs the method as described herein.

In other aspects, the features described above may be combined together in any reasonable combination as will be recognized by those skilled in the art.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations can be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure, or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics can be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

As an illustrative example, a superconducting quantum processor designed to perform adiabatic quantum computation and/or quantum annealing is used in the description that follows. However, as previously described, a person of skill in the art will appreciate that the present systems and methods can be applied to any form of quantum processor hardware (e.g., superconducting, photonic, ion-trap, quantum dot, topological, etc.) implementing any form of quantum algorithm(s) (e.g., adiabatic quantum computation, quantum annealing, gate/circuit-based quantum computing, etc.).

The following provides an overview of terms used throughout this description to aid comprehension. It will be understood that the explanation of each term is not intended to be limiting, and that each term should also be considered in light of the context provided below.

Measurements: Actions that can be taken to produce an observable response in a quantum processor or device. For example, a signal can be applied to a device in the quantum processor, and the response can be measured. The available signals that may be applied to the device define the possible measurements that may be taken, and the resulting data provided by measuring a response is referred to herein as a measurement value. The result or outcome of performing a measurement can be referred to as a measurement value or a measurement result, and can include a series of values, such as a time series defining a response to an applied signal.

Measurement values: A value obtained as a result of a measurement action. For example, when a measurement is performed by applying a selected external bias to a qubit, the average resulting state of that qubit would be a measurement value.

Noisy measurement results: Results of a series of measurement actions that provide values having uncertainty. For example, when measuring the resulting state of a qubit under selected external biases, there will be some uncertainty around the average state determined by the number of times the state (zero or one) is measured.

A set of possible measurements: All of the possible measurements that can be performed on a given device or set of devices. For example, when selecting an external bias to apply to a qubit, the set of possible measurements would be the entire range of possible external bias values.

A subset of possible measurements: A group of measurements selected from the set of the possible measurements. For example, when selecting an external bias to apply to a qubit, a subset may be selected as only bias values that are greater than a previously selected external bias, or only bias values that are less than a previously selected external bias. This may also be a randomly selected subset taken from the set of possible measurements, or a subset of possible measurements may be selected based on some known properties of the quantum device(s). In some implementations the subset may encompass the set of possible measurements.

Measurement schedule: A time series of measurements. For example, a measurement schedule can provide instructions to take measurements of a qubit at a first external bias for a given length of time or number of measurements, and then to take measurements of the qubit at a second external bias for the length of time or number of measurements.

Model: As used herein, a model refers to a computational description of a device, system, set of devices, quantum processor, and/or the interaction between devices or a set of devices. A model of a device may predict the response of a device to an applied signal. A model of an ideal qubit may be developed to predict the behavior of a given physical qubit through measurements and updates of the model to reflect the actual behavior of the physical qubit. The model has model parameters that are used to describe the behavior of the modelled element.

Predicted measurement outcome: The value, set of values, or other result predicted by a model for a given measurement. For example, where the model is a model of an ideal qubit, the predicted measurement outcome for zero external bias applied to the qubit would be an equal probability of the qubit being in either state (zero or one), or an average value of 0.5.

Predicted uncertainty: For a given device, system, set of devices, quantum processor, and/or the interactions between devices or a set of devices, the uncertainty defines the difference between the model and the actual behavior observed. The predicted uncertainty defines the difference between the model and the actual behavior observed after performing measurements and updating the model based on the measurement results. For example, in some instances a particular measurement may provide no new information about a system, therefore providing a predicted uncertainty that is the same as the current uncertainty. More particularly, if a large enough external bias is applied to a qubit that it is always in one state (zero or one), applying an even larger external bias to the qubit would provide no new information about the internal bias offset of that qubit, and therefore the predicted uncertainty for the determinable parameter of internal bias offset would be the same as the current uncertainty and there would be no reduction in uncertainty for the determinable parameter.

Parameters: A parameter, as defined herein, is a quantity whose value might not be known, and is typically a factor forming one of a set that defines a system or the conditions of its operation. The parameters of a given system may include a property of a device, system, set of devices, or interaction between a device or set of devices, that may assume a value which may or may not be known. A system may have parameters that are known, such as, for example, the critical temperature of a superconducting material used in a quantum processor, and parameters that must be determined, such as the internal bias offset of a fabricated qubit.

Determinable parameters: Any parameter of a device or component of a quantum processor for which the value can be determined via direct measurement and/or via calculation based on a measurement. A determinable parameter may be, for example, the internal bias offset of a qubit, the magnitude of cross-talks between two devices within a quantum processor, or the response of a Digital to Analog Converter (DAC) to an applied signal. All of the determinable parameters of a given device or component might not be relevant for a given calibration process. For example, the cross talks between a qubit and another device might not be relevant to the calibration of the individual qubit's internal bias offset.

Physical parameters: One or more physical characteristics of a given device included in a model of the device. In many cases, the physical parameters of the device may be the determinable parameters in question. For example, the internal bias offset of a qubit is a physical parameter of that device. It will be understood that not all determinable parameters are necessarily physical parameters.

Measurement parameters: One or more values that can be input to a model of a given device corresponding to respective measurements. A response may be predicted by the model of the device based in part on the measurement parameters. For example, a model of a qubit may have as a measurement parameter an applied external bias.

Model parameters: One or more determinable parameters and a current uncertainty for the one or more determinable parameters are used as model parameters for the model of the portion of the quantum processor to be calibrated. Model parameters may include physical parameters and measurement parameters, with the physical parameters being the determinable parameters.

Initial values: Initial values can be initial values for the measurement parameters, and in some implementations may include some values for physical parameters that may later be refined by calibration. In the example of modelling the bias of a qubit, the initial values may include the physical parameter of an ideal qubit, that is, zero internal flux bias, and may also include one or more default measurement values, such as the actual average qubit state at zero external bias. The initial values may be generated by a predetermined routine initial measurement schedule, such as a set of measurements taken in a default state and provided as initial values to the digital processor. In other implementations, initial values may be generated randomly, from design information, or from previous measurements done on the quantum processor. For example, some initial values may be provided from measurements done at different stages of calibration, or during device probing to select functional devices.

Preliminary data: Preliminary data can include initial values such as initial measurement values and/or noisy measurement results.

Calibrated value: The calibrated value of one or more determinable parameters is the value determined for that parameter through the calibration process. In some implementations, this can be an exact value. In other implementations, the calibrated value can be determined to some threshold accuracy. For example, it may be required to know the internal qubit bias to a given degree of precision in order to obtain accurate solutions from the quantum processor. The calibrated value of the internal qubit bias is the value assigned to the qubit after the calibration process and may have some variation from the true value for the physical parameter of the qubit.

Exemplary Computing System

Figure 1:
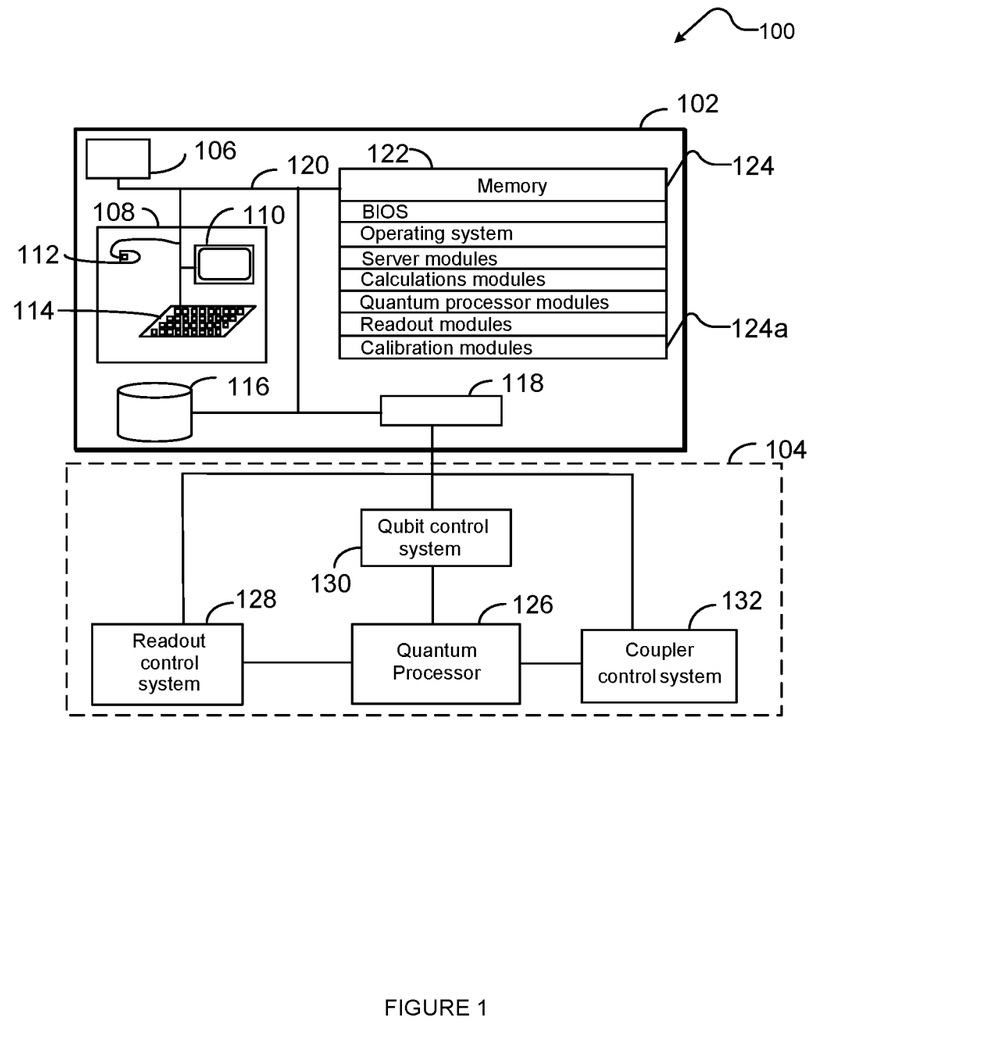
FIG. 1 is a schematic diagram of a hybrid computing system including a digital computer coupled to an analog computer, in accordance with the present systems, devices, and methods.

FIG. 1 illustrates a computing system 100 comprising a digital computer 102. The example digital computer 102 includes one or more digital processors 106 that may be used to perform classical digital processing tasks. Digital computer 102 may further include at least one system memory 122, and at least one system bus 120 that couples various system components, including system memory 122 to digital processor(s) 106. System memory 122 may store one or more sets of processor-executable instructions, which may be referred to as modules 124. For example, system memory 122 may store one or more calibration modules 124a.

The digital processor(s) 106 may be any logic processing unit or circuitry (for example, integrated circuits), such as one or more central processing units ("CPUs"), graphics processing units ("GPUs"), digital signal processors ("DSPs"), application-specific integrated circuits ("ASICs"), programmable gate arrays ("FPGAs"), programmable logic controllers ("PLCs"), etc., and/or combinations of the same.

In some implementations, computing system 100 comprises an analog computer 104, which may include one or more quantum processors 126. Quantum processor 126 may include at least one superconducting integrated circuit. Digital computer 102 may communicate with analog computer 104 via, for instance, a controller 118. Certain computations may be performed by analog computer 104 at the instruction of digital computer 102, as described in greater detail herein.

Digital computer 102 may include a user input/output subsystem 108. In some implementations, the user input/output subsystem includes one or more user input/output components such as a display 110, mouse 112, and/or keyboard 114.

System bus 120 may employ any known bus structures or architectures, including a memory bus with a memory controller, a peripheral bus, and a local bus. System memory 122 may include non-volatile memory, such as read-only memory ("ROM"), static random-access memory ("SRAM"), Flash NAND; and volatile memory such as random-access memory ("RAM") (not shown).

Digital computer 102 may also include other non-transitory computer- or processor-readable storage media or non-volatile memory 116. Non-volatile memory 116 may take a variety of forms, including: a hard disk drive for reading from and writing to a hard disk (for example, a magnetic disk), an optical disk drive for reading from and writing to removable optical disks, and/or a solid-state drive (SSD) for reading from and writing to solid state media (for example NAND-based Flash memory). Non-volatile memory 116 may communicate with digital processor(s) via system bus 120 and may include appropriate interfaces or controllers 118 coupled to system bus 120. Non-volatile memory 116 may serve as long-term storage for processor- or computer-readable instructions, data structures, or other data (sometimes called program modules or modules 124) for digital computer 102.

Although digital computer 102 has been described as employing hard disks, optical disks and/or solid-state storage media, those skilled in the relevant art will appreciate that other types of nontransitory and non-volatile computer-readable media may be employed. Those skilled in the relevant art will appreciate that some computer architectures employ nontransitory volatile memory and nontransitory non-volatile memory. For example, data in volatile memory may be cached to non-volatile memory. Or a solid-state disk that employs integrated circuits to provide non-volatile memory.

Various processor- or computer-readable and/or executable instructions, data structures, or other data may be stored in system memory 122. For example, system memory 122 may store instructions for communicating with remote clients and scheduling use of resources including resources on the digital computer 102 and analog computer 104. Also, for example, system memory 122 may store at least one of processor executable instructions or data that, when executed by at least one processor, causes the at least one processor to execute the various algorithms to execute instructions. In some implementations system memory 122 may store processor- or computer-readable calculation instructions and/or data to perform pre-processing, co-processing, and post-processing to analog computer 104. System memory 122 may store a set of analog computer interface instructions to interact with analog computer 104.

Analog computer 104 may include at least one analog processor such as quantum processor 126. Analog computer 104 may be provided in an isolated environment, for example, in an isolated environment that shields the internal elements of the quantum computer from heat, magnetic field, and other external noise. The isolated environment may include a refrigerator, for instance a dilution refrigerator, operable to cryogenically cool the analog processor, for example to temperature below approximately 1 K.

Analog computer 104 may include programmable elements such as qubits, couplers, and other devices (also referred to herein as controllable devices). Qubits may be read out via readout system 128. Readout results may be sent to other computer- or processor-readable instructions of digital computer 102. Qubits may be controlled via a qubit control system 130. Qubit control system 130 may include on-chip DACs and analog lines that are operable to apply a bias to a target device. Couplers that couple qubits may be controlled via a coupler control system 132. Coupler control system 132 may include tuning elements such as on-chip DACs and analog lines. Qubit control system 130 and coupler control system 132 may be used to implement a quantum annealing schedule as described herein on analog processor 104. Programmable elements may be included in quantum processor 126 in the form of an integrated circuit. Qubits and couplers may be positioned in layers of the integrated circuit that comprise a first material. Other devices, such as readout control system 128, may be positioned in other layers of the integrated circuit that comprise a second material.

Exemplary Superconducting Quantum Processor

Figure 2:
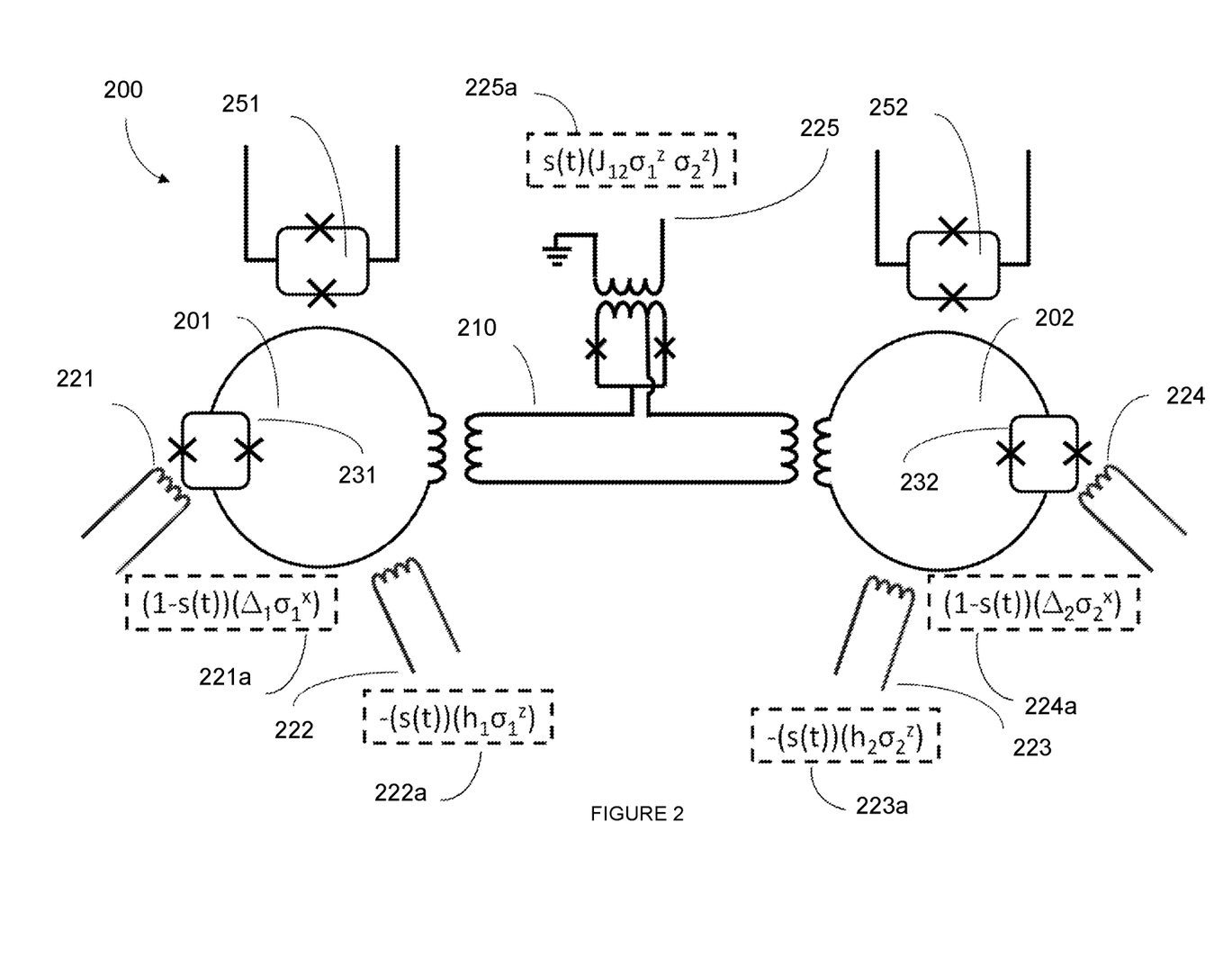
FIG. 2 is a schematic diagram of a portion of an exemplary superconducting quantum processor.

FIG. 2 is a schematic diagram of a portion of an exemplary superconducting quantum processor 200, according to at least one implementation. In some implementations, quantum processor 200 may form all or part of quantum processor 126 in computing system 100 of FIG. 1. The portion of superconducting quantum processor 200 shown in FIG. 2 includes two superconducting qubits 201 and 202. Also shown is a tunable coupling (diagonal coupling) via coupler 210 between qubits 201 and 202 (i.e., providing 2-local interaction). While the portion of quantum processor 200 shown in FIG. 2 includes only two qubits 201, 202 and one coupler 210, those of skill in the art will appreciate that quantum processor 200 may include any number of qubits and any number of couplers coupling information between them.

Quantum processor 200 includes a plurality of interfaces 221, 222, 223, 224, and 225 that are used to configure and control the state of quantum processor 200. Each of interfaces 221-225 may be realized by a respective inductive coupling structure, as illustrated, as part of a programming subsystem and/or an evolution subsystem. Alternatively, or in addition, interfaces 221-225 may be realized by a galvanic coupling structure. In some implementations, one or more of interfaces 221-225 may be driven by DACs. Examples of applications of DACs are described in greater detail in, for example, U.S. Pat. Nos. 7,876,248 and 8,098,179. Such a programming subsystem and/or evolution subsystem may be separate from quantum processor 200, or may be included locally (i.e., on-chip with quantum processor 200).

In the operation of quantum processor 200, interfaces 221 and 224 may each be used to couple a flux signal into a respective compound Josephson junction 231 and 232 of qubits 201 and 202, thereby realizing a tunable tunneling term (the $\Delta_i$ term) in the system Hamiltonian. This coupling provides the off-diagonal $\sigma^x$ terms of the Hamiltonian and these flux signals are examples of "delocalization signals". Examples of Hamiltonians (and their terms) used in quantum computing are described in greater detail in, for example, U.S. Patent Application Publication No. 2014/0344322.

Similarly, interfaces 222 and 223 may each be used to apply a flux signal into a respective qubit loop of qubits 201 and 202, thereby realizing the $h_i$ terms (dimensionless local fields for the qubits) in the system Hamiltonian. This coupling provides the diagonal $\sigma^z$ terms in the system Hamiltonian. Furthermore, interface 225 may be used to couple a flux signal into coupler 210, thereby realizing the $J_{ij}$ term(s) (dimensionless local fields for the couplers) in the system Hamiltonian. This coupling provides the diagonal $\sigma_i^z \sigma_j^z$ terms in the system Hamiltonian.

In FIG. 2, the contribution of each of interfaces 221, 222, 223, 224, 225 to the system Hamiltonian is indicated in boxes 221a, 222a, 223a, 224a, 225a, respectively. As shown, in the example of FIG. 2, boxes 221a-225a are elements of time-varying Hamiltonians for quantum annealing and/or adiabatic quantum computing.

As used herein, the term "quantum processor" generally describes a collection of physical qubits (e.g., qubits 201 and 202) and qubit couplers (e.g., coupler 210). Physical qubits 201 and 202 and coupler 210 are referred to as the "controllable devices" of quantum processor 200 and their corresponding parameters (e.g., the qubit $h_i$ values and the coupler $J_{ij}$ values) are referred to as the "controllable parameters" of the quantum processor. In the context of a quantum processor, the term "programming subsystem" is used to generally describe the interfaces (e.g., "programming interfaces" 222, 223, and 225) used to apply the controllable parameters to the controllable devices of quantum processor 200 and other associated control circuitry and/or instructions. In some implementations, programming interfaces 222, 223, and 225 may include DACs. DACs may also be considered programmable devices that are used to control controllable devices such as qubits, couplers, and parameter tuning devices.

As previously described, the programming interfaces of the programming subsystem may communicate with other subsystems which may be separate from the quantum processor or may be included locally on the quantum processor. For example, qubit control system 130, readout control system 128, and coupler control system 132 of computing system 100 of FIG. 1. The programming subsystem may be configured to receive programming instructions in a machine language of the quantum processor and execute the programming instructions to program the programmable and controllable devices in accordance with the programming instructions. Similarly, in the context of a quantum processor, the term "evolution subsystem" generally includes the interfaces (e.g., "evolution interfaces" 221 and 224) used to evolve devices such as the qubits of the quantum processor 200 and other associated control circuitry and/or instructions. For example, the evolution subsystem may include annealing signal lines and their corresponding interfaces (221, 224) to the qubits (201, 202).

Quantum processor 200 also includes readout devices 251 and 252, where readout device 251 is associated with qubit 201 and readout device 252 is associated with qubit 202. In the example implementation shown in FIG. 2, each of readout devices 251 and 252 includes a direct current superconducting quantum interference device (DC-SQUID) inductively coupled to the corresponding qubit. In the context of quantum processor 200, the term "readout subsystem" is used to generally describe readout devices 251, 252 used to read out the final states of the qubits (e.g., qubits 201 and 202) in the quantum processor to produce a bit string. The readout subsystem may also include other elements, such as routing circuitry (e.g., latching elements, a shift register, or a multiplexer circuit) and/or may be arranged in alternative configurations (e.g., an XY-addressable array, an XYZ-addressable array, etc.), any of which may comprise DACs. Qubit readout may also be performed using alternative circuits, such as that described in International (PCT) Patent Application Publication WO2012064974.

While FIG. 2 illustrates only two physical qubits 201, 202, one coupler 210, and two readout devices 251, 252, a quantum processor (e.g., processor 200) may employ any number of qubits, couplers, and/or readout devices, including a larger number (e.g., hundreds, thousands or more) of qubits, couplers and/or readout devices. The application of the teachings herein to processors with a different (e.g., larger) number of computational components should be readily apparent to those of ordinary skill in the art.

Examples of superconducting qubits include superconducting flux qubits, superconducting charge qubits, and the like. In a superconducting flux qubit, the Josephson energy dominates or is equal to the charging energy. In a charge qubit this is reversed. Examples of flux qubits that may be used include radio frequency superconducting quantum interference devices (RF-SQUIDs), which include: a superconducting loop interrupted by one Josephson junction; persistent current qubits, which include a superconducting loop interrupted by three Josephson junctions; and the like.

The programmable elements of a quantum processor, such as, for example, qubits, couplers, DACs, readout elements, and other devices, typically require calibration prior to use in a quantum processor for problem solving. A calibration may be performed before a quantum processor is operated for the first time. Additionally, it may be advantageous to perform a calibration every time there is a change in the isolated environment of quantum processor, for example during a regular maintenance. Calibrating the devices of a quantum processor is advantageous to obtain well balanced samples from problems to be solved with the quantum processor. The quantum processor may need to be programmed with a problem to be solved, for example by a digital or classical processor, before being operated.

Throughout this specification and the appended claims, elements and/or parameters of a quantum processor that may be measured and/or calibrated during a calibration procedure are referred to as "determinable parameters." Exemplary determinable parameters include: qubit persistent current, mutual inductances between devices, latching device persistent current, and DC-SQUID persistent current. For greater certainty, throughout this specification and appended claims, the term "determinable parameter" is used to refer to any parameter of any device or component of a quantum processor for which the value may be determined via direct measurement and/or via calculation based on a measurement. A determinable parameter may include, for example, a parameter that is designed to have a particular value but, due to the imprecision of fabricating real, physical devices, needs to have its actual value determined during calibration in order to ensure proper operation of the quantum processor. It will be understood that in some implementations a subset of the possible determinable parameters for a given quantum device will be used for calibration, and the determinable parameters referred to for a given quantum device below do not necessarily refer to the complete set of all available possible determinable parameters. For example, calibration of a qubit's internal bias offset as described below may occur separately from calibration of the same qubit's persistent current or inductance. In some implementations, one or more determinable parameters for a given quantum device may be known and may not require calibration, or may not be relevant to a given operation and may not require calibration.

Calibration

As discussed above, analog processors such as analog processor 104 of FIG. 1 have elements such as qubits, couplers, DACs, readout elements, and other devices that typically need to be calibrated. Calibrating the devices of a quantum processor is beneficial to obtain well balanced samples from problems to be solved with the quantum processor. In many implementations, calibration of the devices of a quantum processor may be required before the quantum processor can be used to solve problems. The quantum processor may need to be programmed with a problem to be solved, for example by a digital or classical processor such as digital processor(s) 106 of FIG. 1, before being operated. Variations in performance, caused, for example, by variations in fabrication, cross talks, stray inductances, and other sources of noise may be compensated for by calibration of these devices prior to programming the problem to be solved. As quantum processors increase in size and complexity, the number of devices increases, and the time required for calibration of the quantum processor increases.

Calibration may include developing a model of the physical devices of the quantum processor that accurately predicts the behavior of each device. For example, a model may predict a result of applying a current to a line connected to a device. A properly calibrated model should predict the response of the device to the current accurately. For a given system or device, a specific degree of accuracy for the physical parameters is required in order to provide acceptable behavior of the quantum processor or acceptable solutions to a problem to be solved by the quantum processor.

A model of a quantum device may include physical parameters of the device, such as inductances or capacitances, and measurement parameters, such as codes that may be programmed into the chip. Additionally, the model of the quantum device may include signals that may be applied to a line in communication with a device. The model predicts a measurable behavior of a quantum device, such as a qubit, coupler, digital to analog converter (DAC), other control device, etc., to predict the outcome of one or more measurements of the system. For example, a model of a qubit may predict the probability that the qubit is in the 0 state. A model of multiple qubits may predict the joint probability distribution across two or more qubits. A model of a qubit and a DAC may predict the qubit state based on an output signal from each DAC stage. An example equation and model is discussed in further detail below.

Figure 3:
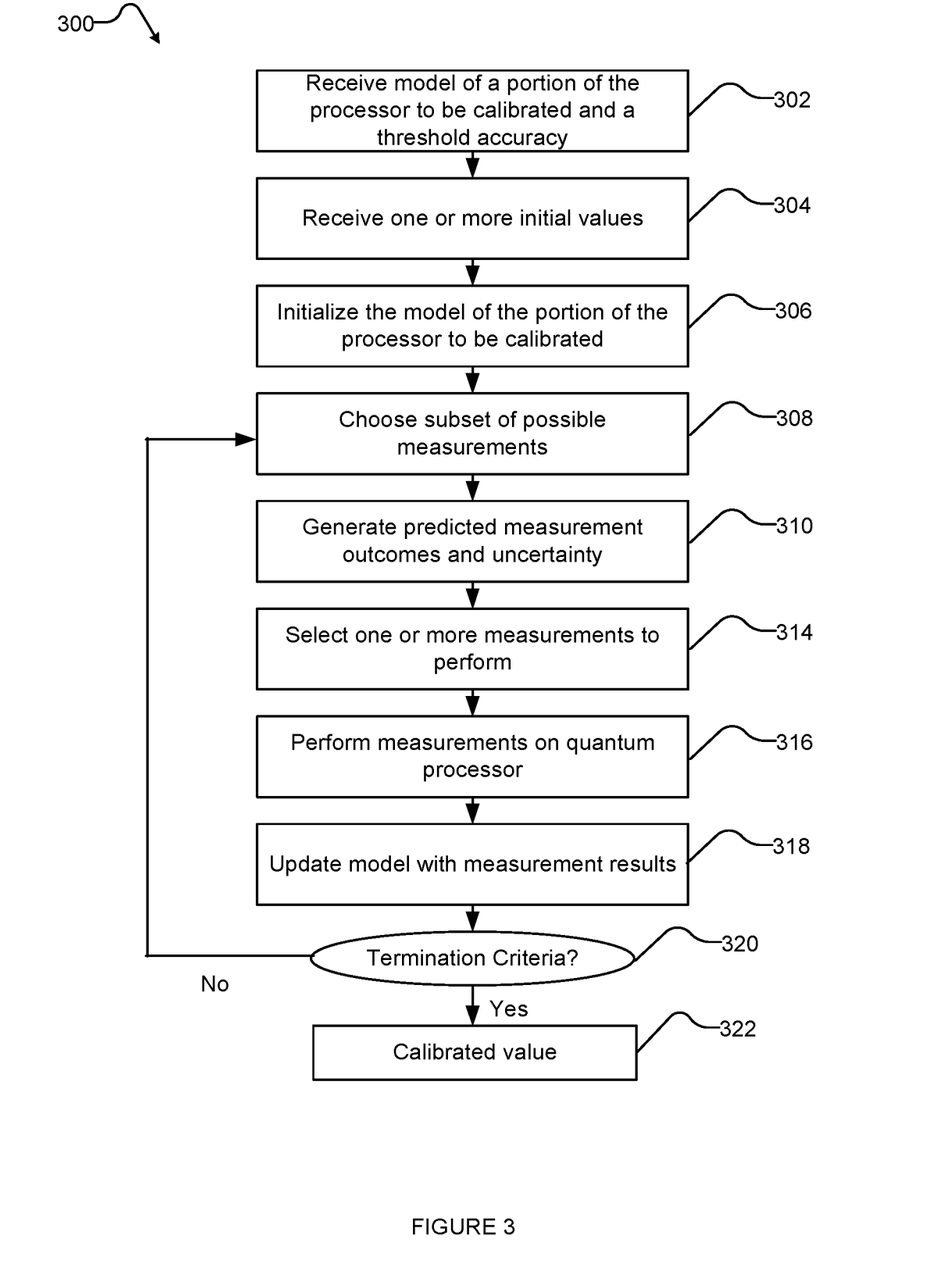
FIG. 3 is a flow chart of a method for improving efficiency of calibration of a quantum processor.

FIG. 3 is a flow diagram of an example method 300 for calibrating a quantum processor. Method 300 may be executed on a hybrid computing system comprising a digital processor in communication with the quantum processor, for example hybrid computing system 100 of FIG. 1 with digital processor 106 and quantum processor 126, and/or quantum processor 200 of FIG. 2. The quantum processor has one or more quantum devices to be calibrated.

Method 300 comprises acts 302 to 322; however, a person skilled in the art will understand that the number of acts is an example and, in some implementations, certain acts may be omitted, further acts may be added, and/or the order of the acts may be changed.

Method 300 starts, for example, in response to a call from another routine, or in response to the start of a calibration procedure.

At 302, the digital processor receives a model of a portion of the quantum processor to be calibrated. The model may predict an outcome of a measurement on the quantum processor. The portion of the quantum processor to be calibrated includes the one or more quantum devices and has one or more determinable parameters. The one or more quantum devices may include one or more of a qubit, a coupler, a DAC, a control structure, a readout device, and combinations thereof. The model of the portion of the quantum processor to be calibrated has model parameters including the one or more determinable parameters and a current uncertainty for the one or more determinable parameters. The model may include physical parameters of the one or more quantum devices and measurement parameters of the one or more quantum devices, and may predict an outcome of a measurement on the quantum processor. An example model is discussed in further detail below. The model may be a quantum-mechanical model of the one or more quantum devices. One example of a model is discussed in further detail with respect to FIG. 4, which describes a model of qubit behavior in response to applied bias.

At 304, the digital processor receives one or more initial values for the model parameters of the model of the portion of the quantum processor to be calibrated. This may include receiving preliminary data for the portion of the quantum processor to be calibrated. Preliminary data may include initial values and/or noisy measurement results. In some implementations, the method may include generating the initial values by instructing the quantum processor to perform one or more initial measurements, and receiving the one or more initial values includes receiving the one or more initial values from the quantum processor. For example, in some implementations the initial values may be generated by a predetermined routine initial measurement schedule, such as a set of measurements taken in a default state and provided as initial values to the digital processor. In other implementations, initial values may be generated randomly, from design information, or from previous measurements performed on the quantum processor.

At 306, the digital processor initializes the model of the portion of the quantum processor to be calibrated based on the one or more initial values. This may include initializing the model of the portion of the quantum processor to be calibrated based on the preliminary data.

At 308, the digital processor chooses a subset of possible measurements from a set of possible measurements for the quantum processor. The selection of the subset of possible measurements may include: selecting the entire set of possible measurements, discretizing the set of possible measurements and selecting a discrete subset, selecting a random subset from the set of possible measurements, and selecting a subset based on known properties of the one or more quantum devices. In some implementations, the selection of the subset of possible measurements may be performed by generating a subset based on a plurality of trained parameters of a machine learning model. In some implementations, at 308 the digital processor may randomly select only a fraction of the measurement space to search at each iteration. For example, the entire space of measurements may be discretized by the digital processor, and one interval may be selected that is expected to be useful, for example, based on properties of the device being calibrated, or based on previous iterations and training of a machine learning model. A machine learning model may select the subset based on results of previous measurements and corresponding uncertainties. Alternatively, a random subset may be selected.

At 310, the digital processor generates a predicted measurement outcome and a predicted uncertainty for the one or more determinable parameters for each measurement in the subset of possible measurements. The digital processor inputs the measurements into the model, generating the predicted measurement outcome and predicted uncertainty for each of the measurement outcomes. In some implementations, the measurement outcomes may be one or more predicted measurement values.

At 314, the digital processor selects one or more measurements from the subset of possible measurements based on a predicted reduction in uncertainty for the one or more determinable parameters. The digital processor may select the measurements by generating a measurement schedule based on a plurality of trained parameters of a machine learning model, as discussed in further detail below. The digital processor may select one or more measurements from the subset of possible measurements based on a projected reduction in a distance between the model prediction of an outcome of a measurement on the quantum processor and the actual outcome of the measurements. The digital processor may select a set of multiple measurements from the subset of possible measurements that are measurable in parallel.

At 316, the digital processor transmits instructions to the quantum processor to perform the one or more measurements and receives the result of the one or more measurements from the quantum processor. Where the digital processor selects a set of multiple measurements that are measurable in parallel, the digital processor may transmit instructions to the quantum processor to perform the set of multiple measurements in parallel.

At 318, the digital processor updates the model of the portion of the quantum processor to be calibrated with the data from the measurements and the new uncertainty resulting from the measurements.

At 320, the digital processor evaluates one or more termination criteria. In some implementations, the termination criteria may be a threshold accuracy for the one or more determinable parameters. Termination criteria may also include iterating a measurement procedure for one or more of: a number of iterations, a processing time, a number of measurements, a number of digital processor cycles, and a number of quantum processor cycles. If the termination criteria are not met, method 300 continues by passing control back to act 308. Acts 308-320 are repeated iteratively until the termination criteria is met. If the one or more termination criteria have been met, control passes to 322, where a calibrated value for the one or more determinable parameters is generated. The digital processor may evaluate the one or more termination criteria by comparing the current uncertainty for the one or more determinable parameters to a threshold accuracy for the one or more determinable parameters and iterating the measurement procedure until the uncertainty for the one or more determinable parameters is less than or equal to the termination criteria.

Method 300 terminates after the termination criteria have been met, until it is, for example, invoked again. In some implementations, method 300 may begin again with respect to another set of devices that require calibration. In some implementations, method 300 may be performed in parallel on multiple devices within the quantum processor. The calibrated value for the determinable parameter may be passed to other algorithms, such as a control algorithm that applies control signals based on the calibrated value. In some implementations, the digital processor may apply a signal to a control device in communication with the one or more quantum devices to adjust operation of the one or more quantum devices in response to generating the calibrated value for the determinable parameter.

Method 300 may beneficially reduce or minimize the cost of obtaining training data to fit a model of a device within a quantum processor. In some implementations, a cost may be the number of times the quantum processor is called to perform experiments and return measurement data. In some implementations, method 300 may reduce or minimize the cost of training a model, such as a machine learning model, as the method may allow for better choice of training data to collect based on the current state of the model. Method 300 may provide an improved or optimal measurement procedure allowing for each measurement made on the quantum processor to improve the fit of the model and reduce the number of measurements required to calibrate a given device to within a threshold.

In some implementations, a model of a device or portion of a quantum processor may be expressed as a function, such as $F(P,M)=Y$, where the variables are defined as follows: P is the physical parameters of the device, such as inductances or capacitances of a device, the physical parameters of the device being the determinable parameters in this example implementation; M is the measurement parameters, such as codes that may be programmed into a DAC or signals that may be applied to a line in communication with a device; and, Y is a result of a measurement, such as a mean of the results of repeated measurements of a qubit output state. In order to calibrate a device, it is beneficial to determine the physical parameters to some degree of accuracy, or in other words, to minimize the distance between the Y generated by the model and the actual response of the physical device. The digital processor may begin with a model having an estimate of physical parameters P, such as the ideal parameters based on the fabrication specification, and a partial set of data including measurement parameters M and noisy measurement results Y, with an estimate of the noise on measurement results Y. The initial values or partial set of data may be, for example, one or more of: data generated based on a routine initial measurement procedure, a randomly selected set of initial data, and measurement values provided by a user. The digital processor may then perform a search through a subset of the possible measurements, and generate predicted measurement outcomes for the possible measurements and new predicted uncertainty for the model based on the predicted measurement outcomes. The subset of possible measurements may be randomly selected or may be selected from a region that is known, either from a trained a machine learning model, or by known properties of the model in question, to provide useful data. The subset of the possible measurements may span the entire space of possible measurements, such as randomly selected values spanning the space of possible measurements. A single measurement or set of measurements can then be selected to be performed such that the distance between the new accuracy and the target accuracy is reduced. In order to improve efficiency of calibration, measurements are selected such that the system converges as quickly as possible. The selected measurement procedure may be more efficient in terms of, for example, one or more of: a reduction in time to calibration, number of measurements performed on the quantum processor, an increase in the number of measurements that can be performed in parallel, or another metric as will be understood by those of skill in the art.

In some implementations, such as where the impact of each measurement on the measurement uncertainty is not well understood, calibration may include the use of a machine learning model. Training of the machine learning model may be performed based on training data, which may include initial measurement values and their corresponding uncertainties. Such training data may be obtained in any suitable manner, such as being provided by a user. For example, a user may provide data from measurements performed while evaluating a quantum processor to determine if it has yielded sufficiently to be a candidate for calibration. Alternatively, a set of routine measurements may be performed to provide training data, with the measured values and their respective uncertainties provided. In other implementations, the machine learning model may use data from previous calibrations of other quantum processors as training data. In other implementations, training of the model may be done without initial training data. For example, measurements may be performed iteratively and the uncertainty of the measured value may be estimated in order to train the machine learning model as to which measurements are most efficient. In some implementations, the training of the machine learning model may use reinforcement learning. Reinforcement learning may be applied to different techniques for training the model, such as those discussed above. In some implementations, reinforcement learning may be implemented to penalize the selection of measurements that do not reduce uncertainty and reward the selection of measurements that do reduce uncertainty.

It may be beneficial to provide minimal training data to the model, as the collection of training data may, for example, be time consuming or expensive computationally. In some implementations, the model may receive only the parameters of the ideal device, and measurements may be selected using reinforcement learning. For example, a first measurement may be performed on the device, and the resulting reduction in uncertainty may be provided back to the model. In the example of calibrating multiple similar devices, the machine learning model may learn from earlier devices the types of measurements that provide the greatest reduction in uncertainty and may generate an improved measurement schedule for each successive device. In other implementations, where a selected measurement does not provide a reduction in uncertainty that is greater than a threshold value, the calibration procedure may select a different subset of possible measurements at the next iteration.

Figure 4:
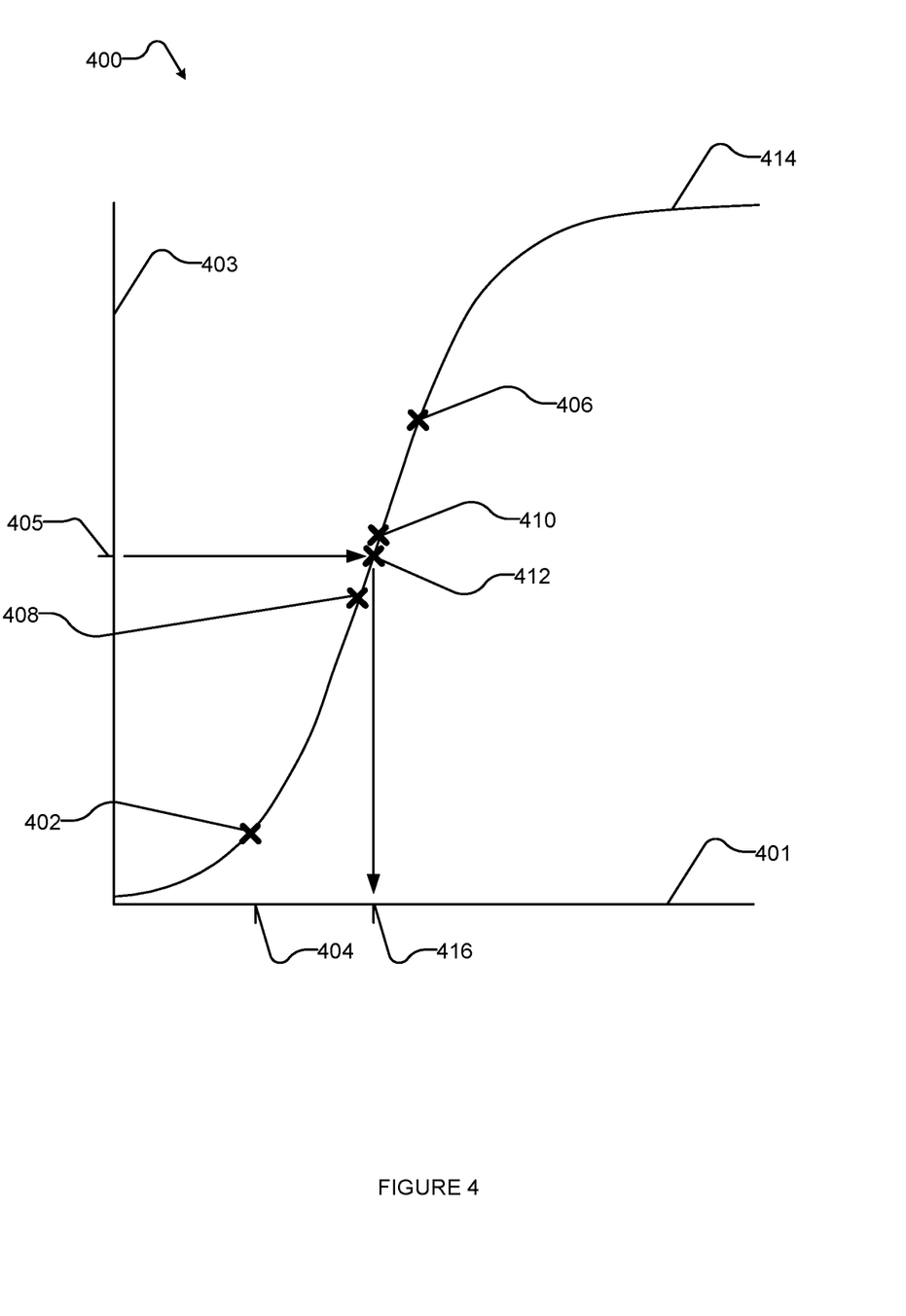
FIG. 4 is an example model representing behavior of a qubit.

FIG. 4 shows an example model of a portion of a quantum processor to be calibrated, and in particular shows a model of qubit bias. An ideal qubit would have an equal probability of being either in the "0" state or the "1" state (also referred to as being "up" or "down") in the absence of an external bias. However, due to variation in fabrication and other factors as discussed above, a given individual qubit may be inherently biased to one state or the other to some degree. In order to calibrate such a qubit, it is beneficial to determine the amount of this inherent bias and to use control devices to apply an external bias that returns the qubit to a net unbiased state, such that it behaves as an ideal qubit during computation.

In an example implementation, a digital processor such as digital processor 106 of FIG. 1 receives a model for the response of an ideal qubit to external bias, with a determinable parameter being the physical qubit's internal bias offset (see the discussion above with respect to act 302). A function for this implementation may be given as f(internal bias offset, external bias offset)=average qubit state. In other words, the physical parameter may be the internal bias offset, which is the parameter to be determined by applying varying external biases and receiving a measurement result. In this example, the external biases are the measurement parameters and the average qubit state is the measurement result.

In graph 400, the x-axis 401 represents the external bias applied to the qubit and the y-axis 403 represents the probability that a qubit is found in a given state. A qubit generally acts as a two state system, and these two states, for example, may be labelled as 0 and 1. Y-axis 403 may, for example, represent the probability that a qubit is found in a 1 state, where the 1 state is the label given to the state that occurs at a greater bias. However, it will be understood that the labels given to the states are arbitrary, and axis 403 could equally be the probability of the 0 state. These states could similarly be labeled "up" and "down", for example. A point 405 represents an even probability of the qubit being found in either state, with increased distance from point 405 in either direction representing a higher probability of being found in a respective state. For an ideal qubit, point 405, where the population of qubit states is essentially even or 50/50 (the average qubit state is 0.5, where the two possible states are 0 and 1) may occur when no external bias is applied, corresponding with a qubit having no internal bias offset. As discussed above, a variety of real-world influences may result in a real qubit having a particular internal bias offset that may be compensated to provide real qubit behavior that is similar or identical to that of an ideal qubit.

An initial value (see the discussion above with respect to act 304) may be a measurement value returned by a first measurement performed on the qubit under consideration. For example, an initial value may be a measure of the average returned state for the qubit at zero external bias, represented as measurement value 402 at bias 404. The model for the qubit's internal bias offset is initialized based on this initial value (see the discussion above with respect to act 306), which, in this example, suggests that the value of the internal bias of the qubit is at a point to the right of bias 404 with some uncertainty. The measurement procedure may then be iterated until a threshold uncertainty of the internal bias of the qubit is reached. A subset of possible measurements may be selected from external bias values greater than bias 404 (see the discussion above with respect to act 308), as based on the measurement value at 402, that subset is known to be more likely to reduce the uncertainty based on the known behavior of qubits (see the discussion above with respect to act 310). Point 406 may represent a selected location for performing a measurement that is predicted to provide a measurement value having the greatest reduction in uncertainty (see the discussion above with respect to act 314). Instructions may be transmitted to the quantum processor to perform measurements of the qubit state at an external bias corresponding with point 406 (see the discussion above with respect to act 316), resulting in a measurement of an average value for the state of the qubit at that external bias. The model can then be updated (see the discussion above with respect to act 318), suggesting that the even point for the qubit is between 402 and 406. The current uncertainty is updated, and a new point is selected from the subset of possible measurements between 402 and 406. Repeating this process iteratively may result in measurements 408, 410, and 412 taken at corresponding external bias values (see the discussion above with respect to act 320). The measurement values corresponding to measurements 408, 410, and 412 result in an updated model for the qubit 414, which suggests that an applied bias 416 applied to the qubit will result in the qubit state probability being even between the states (see the discussion above with respect to act 322).

In the example implementation, the value at bias 416 would be returned as a calibrated value for the individual qubit, and this bias value could be applied by an external bias source to maintain the qubit in an even probability state for problem solving. Taking measurements at 402, 406, 410, and 412 requires that the qubit under consideration be biased by instructions transmitted by the digital processor to the quantum processor to apply a signal corresponding with each amount of external bias. The quantum processor, individual qubit, or collection of qubits may then be annealed multiple times to determine the likely outcome state for the qubit under consideration. For example, the qubit may be annealed 100 times to give an average value and an uncertainty, or the qubit may be annealed 1000 times to give an average value and a lower uncertainty. As each measurement of the qubit is both time and resource demanding, it is beneficial to reduce the number of times that a qubit is biased to a different value and measured, thereby improving the efficiency of the calibration procedure.

It will be understood that similar principles may be applied to different devices within the quantum processor. A measurement or series of measurements may be made based on some input value, and each measurement or series of measurements may provide an increasingly defined model of the device for which further measurements may be made, or calibration of the device may be sufficiently accurate. The threshold accuracy or acceptable uncertainty may be varied depending on the device, and the degree to which variations in the device impact problem solving on the quantum processor.

The above described method(s), process(es), or technique(s) could be implemented by a series of processor readable instructions stored on one or more nontransitory processor-readable media. Some examples of the above described method(s), process(es), or technique(s) method are performed in part by a specialized device such as an adiabatic quantum computer or a quantum annealer or a system to program or otherwise control operation of an adiabatic quantum computer or a quantum annealer, for instance a computer that includes at least one digital processor. The above described method(s), process(es), or technique(s) may include various acts, though those of skill in the art will appreciate that in alternative examples certain acts may be omitted and/or additional acts may be added. Those of skill in the art will appreciate that the illustrated order of the acts is shown for exemplary purposes only and may change in alternative examples. Some of the exemplary acts or operations of the above described method(s), process (es), or technique(s) are performed iteratively. Some acts of the above described method(s), process(es), or technique(s) can be performed during each iteration, after a plurality of iterations, or at the end of all the iterations.

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. The teachings provided herein of the various implementations can be applied to other methods of quantum computation, not necessarily the exemplary methods for quantum computation generally described above.

The various implementations described above can be combined to provide further implementations. All of the commonly assigned US patent application publications, US patent applications, foreign patents, and foreign patent applications referred to in this specification and/or listed in the Application Data Sheet are incorporated herein by reference, in their entirety, including but not limited to: U.S. Pat. Nos. 7,533,068; 7,876,248; 8,008,942; 8,098,179; 8,195,596; 8,190,548; and 8,421,053; U.S. patent application Ser. No. 16/702,096; U.S. Patent Application Publication Nos. 2014/ 0229722; 2014/0344322; 2011/0060780; 2020/0349326; and 2020/0380396; and International (PCT) Patent Application Publication Nos. 2012064974 and 2020112185.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method of calibrating a quantum processor by a digital processor with improved efficiency, the quantum processor comprising one or more quantum devices, the method being performed by the digital processor in communication with the quantum processor, the method comprising:
receiving a model of a portion of the quantum processor to be calibrated, the portion of the quantum processor to be calibrated including the one or more quantum devices, the portion of the quantum processor to be calibrated having one or more determinable parameters, the model of a portion of the quantum processor to be calibrated having as model parameters the one or more determinable parameters and a current uncertainty for each of the one or more determinable parameters;
receiving one or more initial values for the model parameters of the model of a portion of the quantum processor to be calibrated;
initializing the model of the portion of the quantum processor to be calibrated based on the one or more initial values;
iterating a measurement procedure until a termination criteria is reached, the measurement procedure comprising:
choosing a subset of possible measurements from a set of possible measurements for the quantum processor;
generating a predicted measurement outcome and a predicted uncertainty for the one or more determinable parameters for each measurement in the subset of possible measurements;
selecting one or more measurements from the subset of possible measurements based on a predicted reduction in uncertainty for the one or more determinable parameters;
transmitting instructions to the quantum processor to perform the one or more measurements;
receiving a result of the one or more measurements from the quantum processor; and
updating the model of the portion of the quantum processor to be calibrated based on the result of the one or more measurements; and
generating one or more calibrated values for the one or more determinable parameters based on the updated model of the portion of the quantum processor to be calibrated.

2. The method of claim 1, wherein receiving a model of a portion of the quantum processor to be calibrated comprises receiving a model comprising one or more physical parameters of the one or more quantum devices and one or more measurement parameters of the one or more quantum devices, and the model predicts an outcome of a measurement on the quantum processor.

3. The method of claim 1, wherein receiving one or more initial values for the model parameters of the model of a portion of the quantum processor to be calibrated comprises receiving preliminary data for the portion of the quantum processor to be calibrated, and wherein initializing the model of the portion of the quantum processor to be calibrated based on the one or more initial values comprises initializing the model of the portion of the quantum processor to be calibrated based on the preliminary data.

4. The method of claim 3, wherein receiving preliminary data for the portion of the quantum processor to be calibrated comprises receiving noisy measurement results.

5. The method of claim 1, wherein receiving a model of a portion of the quantum processor to be calibrated comprises receiving a quantum-mechanical model of the one or more quantum devices.

6. The method of claim 1, wherein choosing a subset of possible measurements comprises one of: selecting a complete set of possible measurements, discretizing the set of possible measurements and selecting a discrete subset, selecting a random subset of the set of possible measurements, and selecting a subset based on known properties of the one or more quantum devices.

7. The method of claim 1, wherein receiving a model of a portion of the quantum processor to be calibrated, the portion of the quantum processor to be calibrated including the one or more quantum devices comprises receiving a model of a portion of the quantum processor to be calibrated, the portion of the quantum processor to be calibrated including one or more of a qubit, a coupler, a digital to analog converter (DAC), a control structure, and a readout device.

8. The method of claim 1, wherein selecting one or more measurements from the subset of possible measurements based on a predicted reduction in uncertainty for the one or more determinable parameters comprises generating a measurement schedule based on a plurality of trained parameters of a machine learning model.

9. The method of claim 1, further comprising applying a signal to a control device in communication with the one or more quantum devices to adjust operation of the one or more quantum devices in response to generating the calibrated value for the one or more determinable parameters.

10. The method of claim 1, wherein receiving a model of a portion of the quantum processor to be calibrated comprises receiving a model of a portion of the quantum processor to be calibrated that predicts an outcome of a measurement on the quantum processor.

11. The method of claim 10, wherein selecting one or more measurements from the subset of possible measurements based on a predicted reduction in uncertainty for the one or more determinable parameters comprises selecting one or more measurements from the subset of possible measurements based on a projected reduction in a distance between a prediction of the model of an outcome of a measurement on the quantum processor and an actual outcome of the measurements.

12. The method of claim 1, wherein iterating a measurement procedure until a termination criteria is reached comprises iterating a measurement procedure for one of: a number of iterations, a processing time, a number of measurements, a threshold accuracy for the one or more determinable parameters, a number of digital processor cycles, and a number of quantum processor cycles.

13. The method of claim 1, further comprising comparing the current uncertainty for the one or more determinable parameters to a threshold accuracy for the one or more determinable parameters, and wherein iterating a measurement procedure until a termination criteria is reached comprises iterating a measurement procedure until the current uncertainty for the one or more determinable parameters is less than or equal to the termination criteria.

14. The method of claim 1, wherein selecting one or more measurements from the subset of possible measurements comprises selecting a set of multiple measurements from the subset of possible measurements, the set of multiple measurements comprising measurements that are measurable in parallel, and wherein transmitting instructions to the quantum processor to perform the one or more measurements comprises transmitting instructions to the quantum processor to perform the set of multiple measurements in parallel.

15. The method of claim 1, further comprising generating the initial values by instructing the quantum processor to perform one or more initial measurements, and wherein receiving one or more initial values comprises receiving the one or more initial values from the quantum processor.

16. A hybrid computing system, the hybrid computing system comprising:
a quantum processor comprising one or more quantum devices;
a digital processor communicatively coupled with the quantum processor;
at least one non-transitory processor-readable medium that stores at least one of processor-executable instructions and data; and
the digital processor communicatively coupled to the least one non-transitory processor-readable medium, which, in response to execution of the at least one of processor-executable instructions and data:
receives a model of a portion of the quantum processor to be calibrated, the portion of the quantum processor to be calibrated including the one or more quantum devices, the portion of the quantum processor to be calibrated having one or more determinable parameters, the model of a portion of the quantum processor to be calibrated having as model parameters the one or more determinable parameters and a current uncertainty for each of the one or more determinable parameters;
receives one or more initial values for the model parameters of the model of a portion of the quantum processor to be calibrated;
initializes the model of the portion of the quantum processor to be calibrated based on the one or more initial values;
iterates a measurement procedure until a termination criteria is reached, in each iteration of the measurement procedure the digital processor:
chooses a subset of possible measurements from a set of possible measurements for the quantum processor;
generates a predicted measurement outcome and a predicted uncertainty for the one or more determinable parameters for each measurement in the subset of possible measurements;
selects one or more measurements from the subset of possible measurements based on a predicted reduction in uncertainty for the one or more determinable parameters;
transmits instructions to the quantum processor to perform the one or more measurements;
receives a result of the one or more measurements from the quantum processor; and
updates the model of the portion of the quantum processor to be calibrated; and
generates one or more calibrated values for the one or more determinable parameters, following the iterations of the measurement procedure.

17. The hybrid computing system of claim 16, wherein the digital processor receives a model comprising one or more physical parameters of the one or more quantum devices and one or more measurement parameters of the one or more quantum devices, and the model predicts an outcome of a measurement on the quantum processor.

18. The hybrid computing system of claim 16, wherein the portion of the quantum processor to be calibrated includes one or more of a qubit, a coupler, a digital to analog converter (DAC), a control structure, and a readout device.

19. The hybrid computing system of claim 16, wherein in response to execution of the at least one of processor executable instructions and data the digital processor further applies a signal to a control device in communication with the one or more quantum devices to adjust operation of the one or more quantum devices in response to generating a calibrated value for the one or more determinable parameters.

20. The hybrid computing system of claim 16, wherein the model of a portion of the quantum processor to be calibrated predicts an outcome of a measurement on the quantum processor.

21. The hybrid computing system of claim 20, wherein to select one or more measurements from the subset of possible measurements based on a predicted reduction in uncertainty for the one or more determinable parameters the digital processor selects one or more measurements from the subset of possible measurements based on a projected reduction in a distance between a prediction of the model of an outcome of a measurement on the quantum processor and an actual outcome of the measurements.

22. The hybrid computing system of claim 16, wherein the termination criteria comprises one of a number of iterations, a processing time, a number of measurements, a threshold accuracy for the one or more determinable parameters, a number of digital processor cycles, and a number of quantum processor cycles.

* * * * *